(12) United States Patent
Suzuki et al.

(10) Patent No.: US 9,292,011 B2
(45) Date of Patent: Mar. 22, 2016

(54) OPERATING MACHINE AND MAINTENANCE AND INSPECTION INFORMATION GENERATING APPARATUS

(75) Inventors: Hideaki Suzuki, Tokyo (JP); Kozo Nakamura, Tokyo (JP); Shinya Yuda, Tokyo (JP); Hiroki Uchiyama, Tokyo (JP); Takashi Saeki, Tokyo (JP); Kesaaki Minemura, Tokyo (JP); Jyunsuke Fujiwara, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 359 days.

(21) Appl. No.: 14/113,633

(22) PCT Filed: Apr. 24, 2012

(86) PCT No.: PCT/JP2012/060990
§ 371 (c)(1),
(2), (4) Date: Oct. 24, 2013

(87) PCT Pub. No.: WO2012/147751
PCT Pub. Date: Nov. 1, 2012

(65) Prior Publication Data
US 2014/0052299 A1    Feb. 20, 2014

(30) Foreign Application Priority Data

Apr. 28, 2011    (JP) ................................. 2011-101897

(51) Int. Cl.
*G05B 15/02* (2006.01)
*E02F 9/26* (2006.01)
*G06Q 10/00* (2012.01)

(52) U.S. Cl.
CPC ................ *G05B 15/02* (2013.01); *E02F 9/267* (2013.01); *G06Q 10/20* (2013.01)

(58) Field of Classification Search
CPC .......... G05B 15/02; G06Q 10/20; E02F 9/267
USPC .......................................................... 700/275
See application file for complete search history.

(56) References Cited

U.S. PATENT DOCUMENTS

| 5,970,436 A | * | 10/1999 | Berg | ...................... G07C 5/04 701/29.4 |
| 2005/0262838 A1 | * | 12/2005 | Kageyama | ................ E02F 9/20 60/453 |
| 2011/0304169 A1 | * | 12/2011 | Nakayoshi | .......... B60R 16/0239 296/37.15 |

FOREIGN PATENT DOCUMENTS

| JP | 2002-352024 A | 12/2002 |
| JP | 2003-217009 A | 7/2003 |
| JP | 2005-173979 A | 6/2005 |
| JP | 2007-226037 A | 9/2007 |
| JP | 2007-327332 A | 12/2007 |
| WO | 01/73215 A1 | 10/2001 |

OTHER PUBLICATIONS

Masaaki et al (machine translation JP2003217009).*
Nobuhiko et al (machine translation JP2007226037).*

* cited by examiner

*Primary Examiner* — Kenneth M Lo
*Assistant Examiner* — Derrick Boateng
(74) *Attorney, Agent, or Firm* — Baker Botts L.L.P.

(57) ABSTRACT

A hydraulic shovel includes: a storage unit which stores an operation history of a target component of the shovel targeted for life span estimation, a discrimination threshold value used for classifying usage of the target component into a plurality of usage modes based on the operation history, and a usage mode-specific estimated life span indicative of an estimated life span of the target component in each of the usage modes; and an arithmetic and control unit which calculates an operating time of the target component in each of the usage modes in accordance with the operation history and the discrimination threshold value, and estimates the life span of the target component based on the operating time calculated for each of the usage modes and on the usage mode-specific estimated life span.

9 Claims, 14 Drawing Sheets

FIG.6

| CLASS NO. | ENGINE REVOLUTION SPEED | PUMP PRESSURE | APPLICABLE SEGMENT |
|---|---|---|---|
| 1 | >R1 | >P1 | Sa |
| – | >R2, ≤R1 | | – |
| – | ≤R2 | | – |
| – | >R1 | ≤P1 | – |
| 2 | >R2, ≤R1 | | Sb |
| 3 | ≤R2 | | Sc |

| CLASS NO. | COMPONENT LIFE SPANS | |
|---|---|---|
| | ENGINE | PUMP |
| 1 | LEa | LPa |
| 2 | LEb | LPb |
| 3 | LEc | LPc |

FIG.8

| OPERATING DAY | CLASS NO. | | |
|---|---|---|---|
| | 1 | 2 | 3 |
| d01 | Sa_d01 | Sb_d01 | Sc_d01 |
| d02 | Sa_d02 | Sb_d02 | Sc_d02 |
| ⋮ | ⋮ | ⋮ | ⋮ |
| ⋮ | ⋮ | ⋮ | ⋮ |
| dN | Sa_dN | Sb_dN | Sc_dN |
| | | | |
| CUMULATIVE OPERATING TIME | Ta | Tb | Tc |

FIG.15

| REPLACEMENT DATE AND TIME | MACHINE NO. | COMPONENT NO. | COMPONENT TYPE | COMPONENT OPERATING TIME |
|---|---|---|---|---|
| 2010/1/1 | EX1001 | e1 | ENGINE | LE1 |
| 2010/1/15 | EX1002 | e2 | ENGINE | LE2 |
| 2010/1/15 | EX1002 | p1 | PUMP | LP1 |
| 2010/2/3 | EX1010 | p2 | PUMP | LP2 |
| 2010/2/15 | EX1025 | e3 | ENGINE | LE3 |
| 2010/2/15 | EX1025 | p3 | PUMP | LP3 |
| 2010/2/21 | EX1030 | p4 | PUMP | LP4 |
| ⋮ | | | | |
| 2010/6/9 | EX1100 | en | ENGINE | LEn |
| 2010/7/3 | EX1103 | pm | PUMP | LPm |

FIG.16

| COMPONENT NO. | CLASS NO. | | |
|---|---|---|---|
| | 1 | 2 | 3 |
| e1 | Tae1 | Tbe1 | Tce1 |
| e2 | Tae2 | Tbe2 | Tce2 |
| p1 | Tap1 | Tbp1 | Tcp1 |
| p2 | Tap2 | Tbp2 | Tcp2 |
| e3 | Tae3 | Tbe3 | Tce3 |
| p3 | Tap3 | Tbp3 | Tcp3 |
| p4 | Tap4 | Tbp4 | Tcp4 |
| ⋮ | | | |
| en | Taen | Tben | Tcen |
| pm | Tapm | Tbpm | Tcpm |

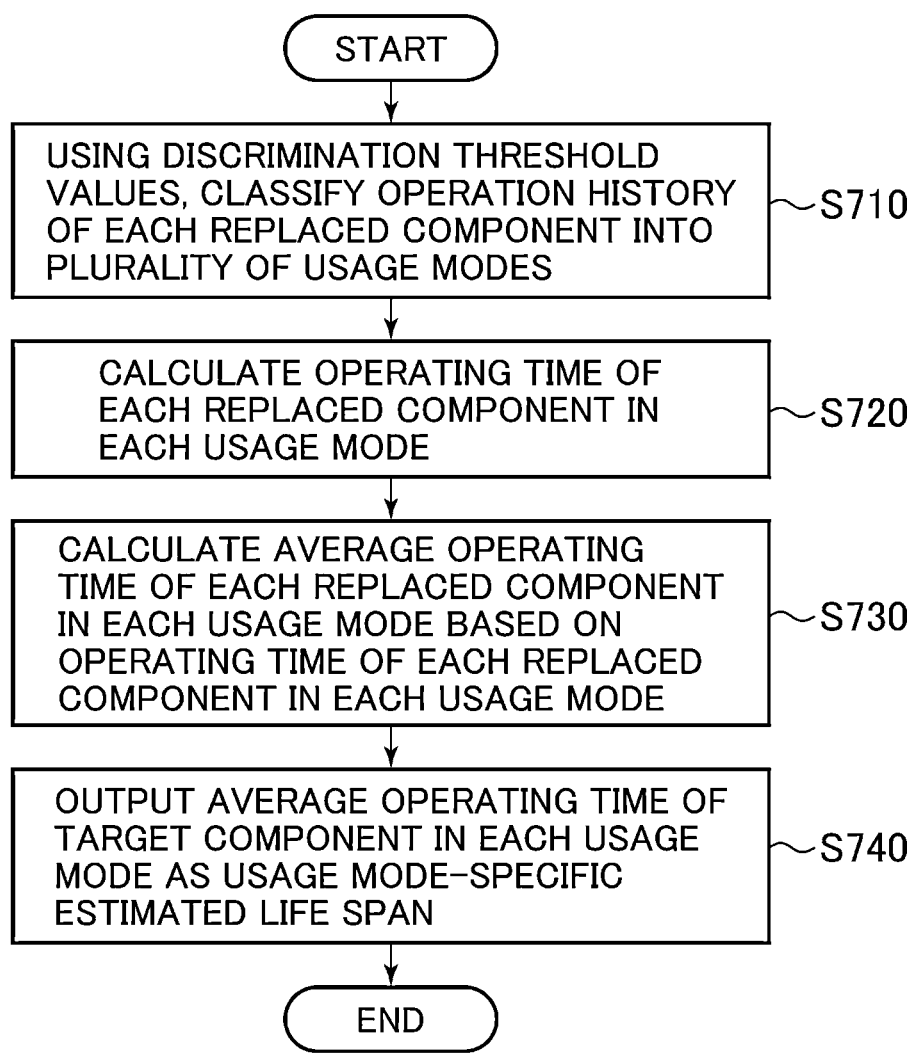

OPERATING MACHINE AND MAINTENANCE AND INSPECTION INFORMATION GENERATING APPARATUS

TECHNICAL FIELD

The present invention relates to an operating machine and a maintenance and inspection information generating apparatus offering information about the maintenance of that operating machine based on its operating conditions.

BACKGROUND ART

Operating machines for industrial use such as construction machinery will have a significant influence if they stop due to failure or other causes. Thus these machines are often subject to preventive maintenance that keeps the machines in an optimized state. What is generally carried out is periodic maintenance mainly by reference to the operating time. Components of the machines are inspected, overhauled, and replaced as per design criteria and in accordance with the operating time of the machines.

As long as preventive maintenance is performed, the machines should not fail because their good conditions are kept up. In practice, however, they inevitably fail and stop. For example, if a machine is used under loads greater than what is expected by design criteria, its components can run down faster than expected and cause the machine to fail and stop. That is, the cause of component failure lies in a mismatch between stipulated design criteria and the operating conditions in the actual operating environment.

In view of the above, there have been disclosed an invention whereby the time for maintenance and replacement of each of the components of a machine is totaled and statistically processed to obtain the actual life spans of the components for practical use (PCT Patent Publication No. WO01/073215 Pamphlet) and an invention whereby the life spans of components are estimated in accordance with operating time and location (JP-2005-173979-A). Also disclosed is an invention whereby the usage limit of a machine is estimated based on sensor reference values and the rates of change in sensor values with regard to the model of the machine and the failure mode of its components (JP-2002-352024-A).

PRIOR ART LITERATURE

Patent Literature

Patent Literature 1: PCT Patent Publication No. WO01/073215 Pamphlet
Patent Literature 2: JP-2005-173979-A
Patent Literature 3: JP-2002-352024-A

SUMMARY OF THE INVENTION

Problems to be Solved by the Invention

However, the above-cited inventions involve carrying out a statistical process of which the population is formed by operating machines subject to different use conditions, i.e., targets with different failure probabilities. This has led to the possibility that the accuracy in estimating the life spans of the components of an operating machine may vary depending on the usage mode of the machine in question, and has posed problems when the inventions are to be actually implemented because of complicated preparation of the criteria for life span estimation.

The present invention is made in view of the foregoing and other problems, and an object of the present invention is to provide an operating machine and a maintenance and inspection information generating apparatus offering high accuracy in estimating the life spans of components of the operating machine.

Means for Solving the Problems

In achieving the foregoing problems, the present invention provides an operating machine constituted by a plurality of components. The operating machine includes: a storage unit which stores an operation history of a target component included in the plurality of components and targeted for life span estimation, a discrimination threshold value used for classifying usage of the target component into a plurality of usage modes based on the operation history, and a usage mode-specific estimated life span indicative of an estimated life span of the target component in each of the usage modes; and an arithmetic and control unit which performs a process of calculating an operating time of the target component in each of the usage modes based on the operation history and discrimination threshold value of the target component, and a process of estimating the life span of the target component based on the operating time of the target component calculated for each of the usage modes in the aforementioned process and on the usage mode-specific estimated life span.

Effect of the Invention

According to the present invention, the life spans of components of each operating machine are estimated in accordance with the usage mode of the operating machine in question. This makes it possible to improve the accuracy in estimating the life spans of the components constituting the operating machine.

BRIEF DESCRIPTION OF THE DRAWINGS

FIG. 6 is a classification table in which the operation histories of an engine and the hydraulic pump are classified into a plurality of usage modes in accordance with discrimination threshold values R1, R2 and P1.

FIG. 7 is a table indicating, by class number, usage mode-specific estimated life spans of the engine and hydraulic pump.

FIG. 8 is a table showing typical operation histories of the engine and hydraulic pump on the hydraulic shovel 1.

FIG. 15 is a table showing typical data stored in a replacement history storage section 24 according to the second embodiment of the present invention.

FIG. 16 is a table showing typical operating time data about target replaced components calculated for each of different usage modes by a replaced component operating time calculation section 13 according to the second embodiment of the present invention.

FIG. 17 is a flowchart of a typical usage mode-specific estimated life span calculation process performed by the maintenance and inspection information generating apparatus 100 according to the second embodiment of the present invention.

MODE FOR CARRYING OUT THE INVENTION

Some embodiments of the present invention are explained below using the accompanying drawings.

Figure 1:
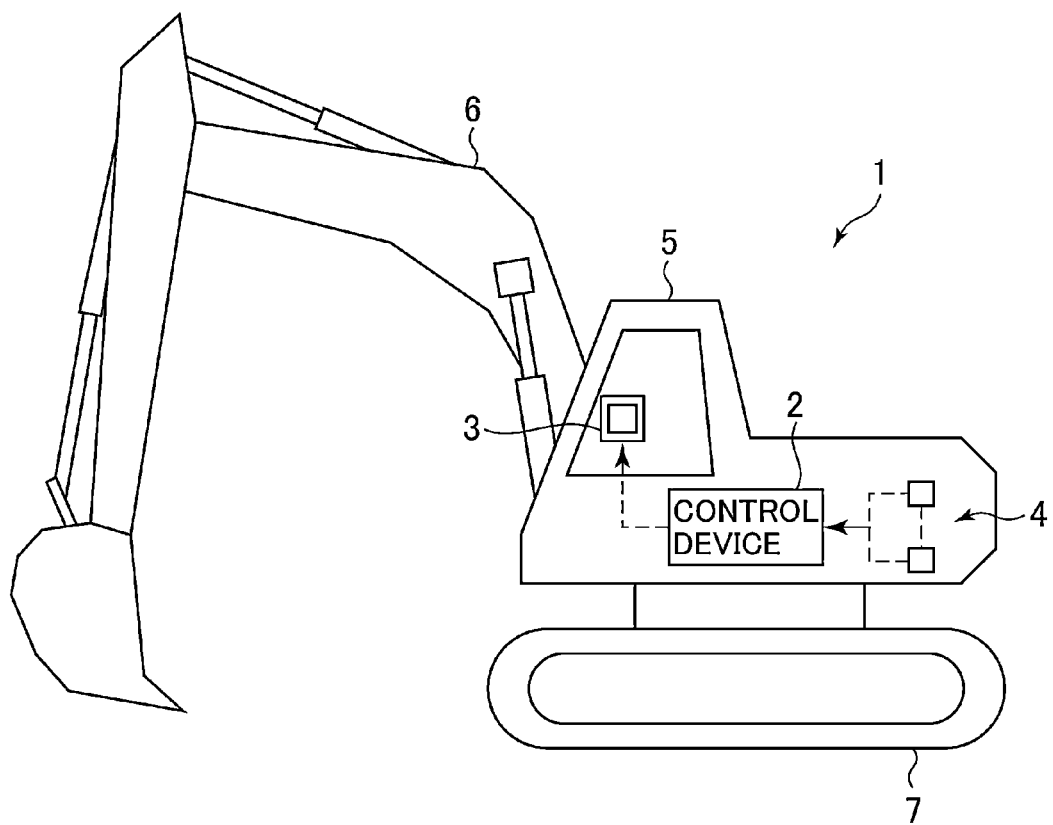
FIG. 1 is a configuration diagram of an operating machine according to a first embodiment of the present invention.
Figure 2:
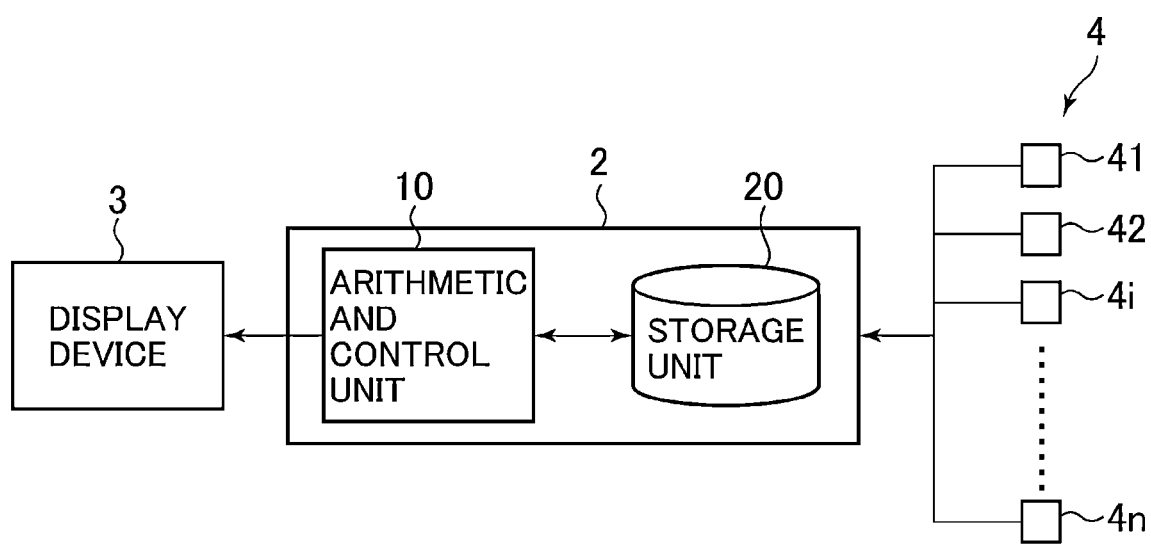
FIG. 2 is a schematic diagram showing the hardware configuration of a control device and its peripheries according to the first embodiment of the present invention.
Figure 3:
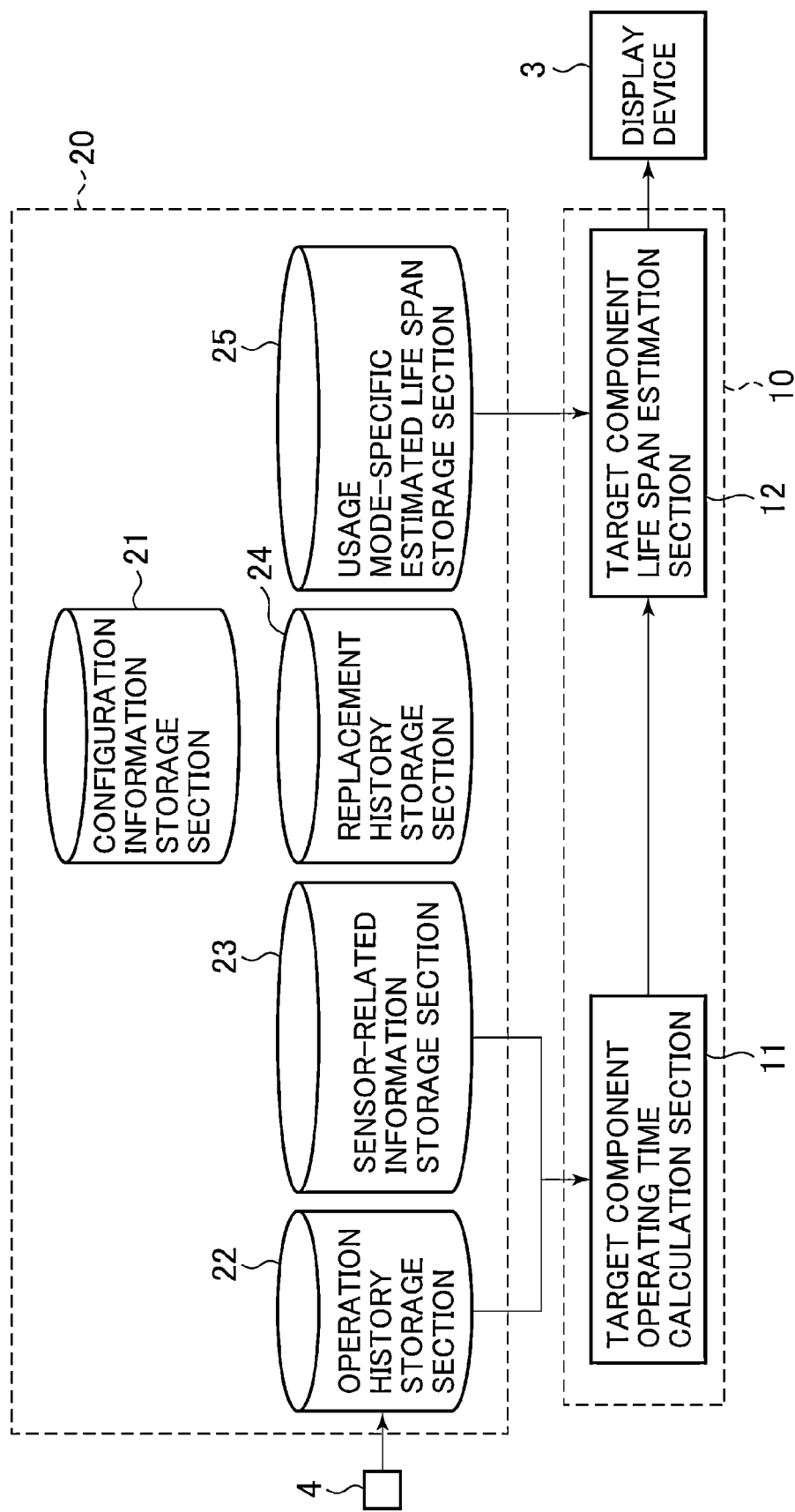
FIG. 3 is a detail plan of the hardware configuration shown in FIG. 2.

FIG. 1 is a configuration diagram of an operating machine according to a first embodiment of the present invention, FIG. 2 is a schematic diagram showing the hardware configuration of a control device and its peripheries according to the first embodiment of the present invention, and FIG. 3 is a detail plan of the hardware configuration shown in FIG. 2. As shown in FIG. 1, what is explained here is the embodiment that uses as the operating machine a hydraulic shovel that serves as a construction machine.

A hydraulic shovel (operating machine) 1 shown in FIG. 1 is composed of a plurality of components including a lower track structure 7, an upper swing structure 5 mounted rotatably on the top of the lower track structure 7, a multi-jointed work implement 6 attached swingably to the upper swing structure 5, a sensor group 4 made up of a plurality of sensors that detect the operation history of each of the components constituting the hydraulic shovel 1, a control device 2 that generates maintenance and inspection information about each of the components of the hydraulic shovel 1 (e.g., life span of each component) based on the operation histories output from each of the sensors of the sensor group 4, and a display device 3 that displays the maintenance and inspection information generated by the control device 2.

The sensors of the sensor group 4 includes, for example, an engine revolution speed sensor 41 (see FIG. 2) that detects the revolution speed of an engine (not shown) on the hydraulic shovel 1, and a pressure sensor 42 (see FIG. 2) that detects the delivery pressure of a hydraulic pump driven by the engine, i.e., a device (not shown) feeding an operating fluid to a hydraulic actuator (e.g., a hydraulic cylinder for driving the work implement 6) of the hydraulic shovel 1.

As shown in FIG. 2, the control device 2 includes a storage unit 20 made up of a hard disk, a RAM, a ROM, etc., and an arithmetic and control unit (e.g., CPU) 10 that executes diverse processes for generating the maintenance and inspection information about the operating machine in accordance with programs stored in the storage unit 20. The operation history of each component coming from each of the sensors constituting the sensor group 4 is output to the control device 2 and stored into the storage unit 20.

Figure 4:
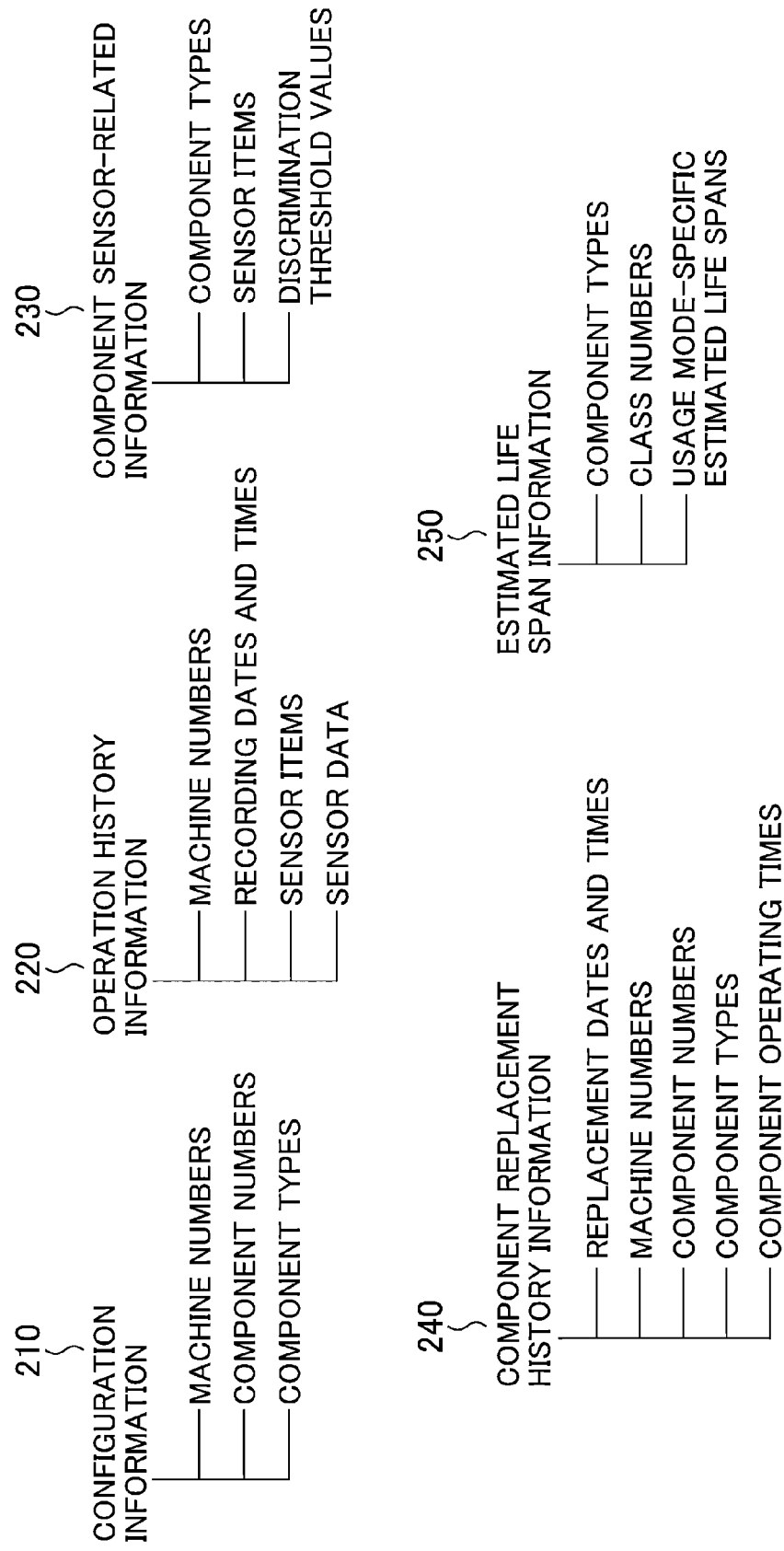
FIG. 4 is a diagram showing typical data items stored in a storage unit according to the first embodiment of the present invention.

As shown in FIG. 3, the storage unit 20 includes a configuration information storage section 21, an operation history storage section 22, a sensor-related information storage section 23, a replacement history storage section 24, and a usage mode-specific estimated life span storage section 25. FIG. 4 is a diagram showing typical data items stored in the storage unit 20.

The configuration information storage section 21 stores configuration information 210 shown in FIG. 4. The configuration information 210 indicates identification information about each hydraulic shovel 1 (operating machine) and components with which each hydraulic shovel 1 is configured. As such, the configuration information 210 includes an identification number (machine number) of each hydraulic shovel 1, identification numbers of the components contained in each hydraulic shovel 1 (component numbers), and the types of the components contained in each hydraulic shovel 1 (component types). For example, the hydraulic shovel 1 is configured with: structures such as an arm, a boom, a turning wheel, crawlers, and heat exchangers; key components such as an engine, a hydraulic pump, a bucket, and hydraulic cylinders; and consumable components such as oil and filters. Each component is provided with an identification number (component number) for management purposes. To maintain the performance of each operating machine requires carrying out maintenance work that involves replacing worn or failed components with new ones.

The operation history storage section 22 stores operation history information 220 about each of the components making up each hydraulic shovel 1. The operation history information 220 includes, as shown in FIG. 4, the machine number, sensor items, sensor data (sensor-detected values), and sensor data recording dates and times. With this embodiment, the sensor items of the hydraulic shovel 1 include an outside air temperature, an outside pressure, the engine revolution speed, an operating fluid temperature, a cooling water temperature, a pump pressure, and an operating pressure. The sensor data refers to sensing data about each component detected by each of the sensors constituting the sensor group 4. The sensor data may be obtained by the unit measuring time. When numerous sensor data about each of the sensor items are collected in chronological order, they constitute operation histories.

Figure 5:
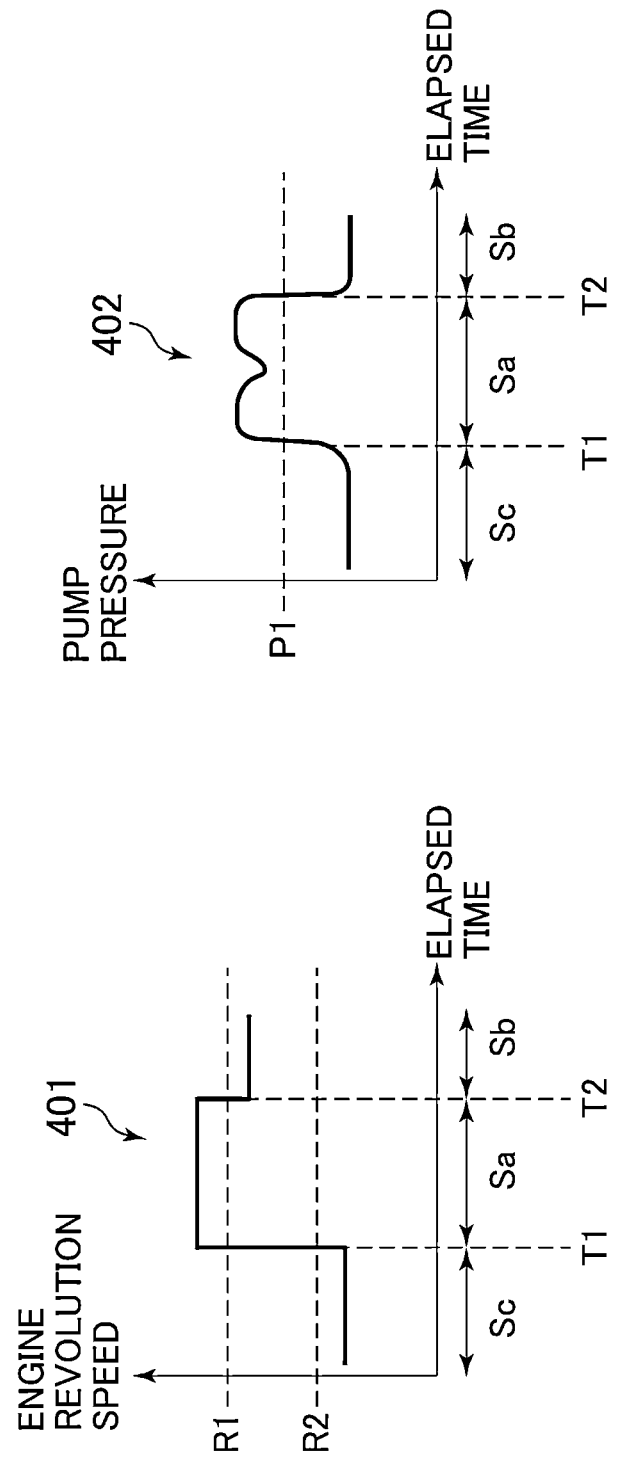
FIG. 5 is a diagram graphically showing an operation history made of the engine revolution speed and pump pressure (delivery pressure of a hydraulic pump) of a hydraulic shovel 1.

FIG. 5 is a diagram graphically showing an operation history made up of the engine revolution speed and pump pressure (delivery pressure of the hydraulic pump) of the hydraulic shovel 1. The operation history shown in this drawing is stored based on the sensor data detected by the engine revolution speed sensor 41 and pressure sensor 42. In FIG. 5, an engine revolution speed history 401 indicates those changes in the engine revolution speed that are detected by the engine revolution speed sensor 41. In the example of FIG. 5, the value is changed at times T1 and T2. A pump pressure history 402 indicates those changes in the pump pressure that are detected by the pressure sensor 42. In the example of FIG. 5, the value is also changed at times T1 and T2 as with the engine revolution speed.

The sensor-related information storage section 23 stores component sensor-related information 230 indicated in FIG. 4. The component sensor-related information 230 is information about the sensor items related to the wear and failure of components, and includes component types, sensor items, and discrimination threshold values. The discrimination threshold values are sensor data boundary values used to classify the usage of each component into a plurality of usage modes based on its operation history. As such, the discrimination threshold values are set for each component type and each sensor item. That is, the discrimination threshold values indicate sensor data boundary conditions for discriminating how each component is subjected to its load (i.e., degree of wear). With this embodiment, the usage of each component is classified into a plurality of usage modes using the discrimination threshold values and based on the magnitude of the sensor data. The degree of wear or degradation of each component is then measured based on the length of the time during which each component was used in each usage mode.

For example, the discrimination threshold values for the engine revolution speed shown in FIG. 5 are R1 and R2 (R1>R2), and the discrimination threshold value for the pump pressure is P1. Thus the usage of the engine is classified into a plurality of usage modes based on the operation history of the engine revolution speed and on the discrimination threshold values R1 and R2. Specifically, the usage of the engine may be classified into three segments Sa, Sb and Sc with their boundaries at time T1 and time T2. That is, the segment Sa from time T1 to time T2 is a segment in which the engine revolution speed is R1 or higher; the segment Sb subsequent to time T2 is a segment in which the engine revolution speed is R2 or higher and lower than R1; and the segment Sc up to time T1 is a segment in which the engine revolution speed is lower than R2. Also, the usage of the hydraulic pump may be classified into three segments Sa, Sb and Sc with their boundaries at time T1 and time T2, based on the operation history of the pump pressure and on the discrimination threshold value P1. That is, the segment Sa is a segment where the pump revolution speed is P1 or higher, and the segments Sb and Sc are each a segment where the pump revolution speed is lower than P1.

FIG. 6 is a classification table in which the operation histories of the engine and hydraulic pump are classified into a plurality of usage modes in accordance with the discrimination threshold values R1, R2 and P1. As shown in FIG. 6, the usage of the engine and the usage of the hydraulic pump on the hydraulic shovel of this embodiment are classified into three usage modes in accordance with the operation history in FIG. 5 and with the above-mentioned discrimination threshold values. In this case, class numbers are used to discriminate the usage modes. Each of the classified usage modes is provided with a class number as information for identifying each usage mode. In the example of FIG. 6, class numbers 1, 2 and 3 are furnished. The smaller the class number assigned to a usage mode, the higher the load to which the component in that usage mode is subjected (i.e., the load with the class number 1 is the highest). In the classification table 501, the absence of an assigned class number indicates the absence of the corresponding operation data in that state. Also in the example of FIG. 6, usage mode classification is carried out by having the operation histories of two components (operation histories of engine revolution speed and pump pressure) associated with each other. Alternatively, usage mode classification may be accomplished on the basis of the operation history of one component or by having operation histories of three or more components associated with one another.

The replacement history storage section 24 stores component replacement history information 240 made up of past records of the components replaced on each hydraulic shovel 1. As shown in FIG. 4, the component replacement history information 240 includes the dates and times of the replacement of previously operated components (replaced components) on each hydraulic shovel 1 (replacement dates and times), the machine number of the machine on which the replaced components were operated, the component numbers of the replaced components, the component types of the replaced components, and component operating times indicative of the time worked by each replaced component. The component operating time in this context refers to the time actually worked by a given component since the beginning of its operation until its replacement (i.e., life span of the component in question).

The usage mode-specific estimated life span storage section 25 stores estimated life span information 250 used for calculating the estimated life span of each of the components operating on the hydraulic shovel 1. As shown in FIG. 4, the estimated life span information 250 includes component types, class numbers, and usage mode-specific estimated life spans. The usage mode-specific estimated life span in this context refers to the estimated time (estimated life span) worked by a given component when that component was used in each usage mode alone. With this embodiment, the usage mode-specific estimated life spans are each determined in relation to the type and usage mode (class number) of each component.

FIG. 7 is a table indicating, by the class number, usage mode-specific estimated life spans of the engine and hydraulic pump. As shown in FIG. 7, if the engine is used continuously in the usage mode related to the class number 1, the life span of the engine is estimated to be LEa.

The arithmetic and control unit 10 functions, as shown in FIG. 3, mainly as an operating time calculation section (target component operating time calculation section) 11 regarding the component targeted for life span estimation (target component) and as a life span estimation section 12 regarding the target component (target component life span calculation section).

The operating time calculation section 11 is a section that performs the process of calculating the operating time of a given target component in each of its usage modes based on the operation history of the target component stored in the operation history storage section 22 and on the discrimination threshold values for the target component stored in the sensor-related information storage section 23.

FIG. 8 is a table showing typical operation histories of the engine and hydraulic pump on the hydraulic shovel 1. In the example of FIG. 8, first, day-to-day operation histories (by the operating day) of each target component are classified using the discrimination threshold values so as to calculate the daily operating time for each usage mode (class number). Ultimately, the daily operating times are added up to calculate the operating time of the target component for each usage mode. In FIG. 8, for example, on the first day the target component started to be used (d01), the operating time is Sa_d01 for the class number 1, Sb_d01 for the class number 2, and Sc_d01 for the class number 3. The cumulative operating time from the first day (d01) up to the present (Nth day (dN)) is Ta for the usage mode corresponding to the class number 1, Tb for the usage mode corresponding to the class number 2, and Tc for the usage mode corresponding to the class number 3. Incidentally, in the example of FIG. 8, the operating time was calculated at predetermined intervals (daily) with a view to raising the speed of operating time calculation, the daily operating times being later added up to calculate the operating time for each of the actual usage modes. Alternatively, some other calculating methods may be adopted. For example, the operation histories from the first day up to the Nth day may be classified in one go to calculate the operating time for each usage mode.

The life span estimation section 12 is a section that performs the process of estimating the life span of a given target component based on the operating time of the target component calculated for each usage mode by the operating time calculation section 11 and on the usage mode-specific estimated life spans stored in the usage mode-specific estimated life span storage section 25. With this embodiment, the consumed life span of a given target component is first calculated, and the remaining life span of the target component is calculated from its consumed life span. Specifically, the operating times (e.g., Ta, Tb and Tc in FIG. 8) calculated for each of the usage modes (class numbers) by the operating time calculation section 11 are first divided by the usage mode-specific estimated life spans (e.g., LEa, LEb and LEc in FIG. 7) corresponding to the usage modes so as to calculate a consumed life span ratio for each usage mode. The consumed life span ratios thus calculated are then added up to calculate the consumed life span ratio (e.g., CE (to be discussed later)) of the target component. The calculated consumed life span ratio is subtracted from the average life span of the target component so as to calculate the remaining life span of the target component. The consumed life span and remaining life span thus calculated are output to the display device 3.

Explained below is a maintenance and inspection information generation process performed on the hydraulic shovel 1 configured as described above. What is explained here is the case where the engine and hydraulic pump are the target components for life span estimation.

Figure 9:
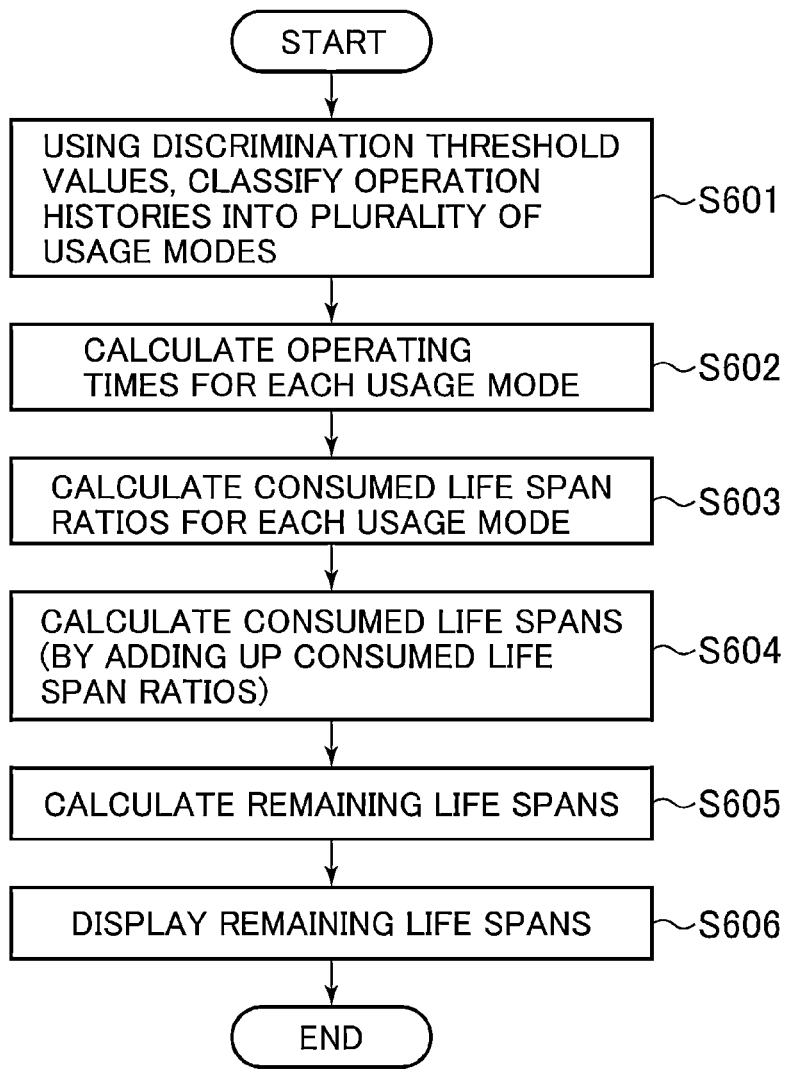
FIG. 9 is a flowchart showing a typical process performed by the control device 2 according to the first embodiment of the present invention.

FIG. 9 is a flowchart showing a typical process performed by the control device 2 according to the first embodiment of the present invention. As shown in FIG. 9, upon admitting the operation histories of the engine and hydraulic pump as the target components through the engine revolution speed sensor 41 and pressure sensor 42, the operating time calculation section 11 classifies the usage of the engine and the usage of the hydraulic pump into three usage modes as shown in the classification table of FIG. 6, based on the input operation histories and in accordance with the discrimination threshold values R1, R2 and P3 (S601).

Then, the operating time calculation section 11 calculates the operating time of the engine and the operating time of the hydraulic pump for each of the usage modes classified. This calculates the operating time of each target component for each usage mode from the first day (d01) the target components (engine and hydraulic pump) started to be operated up to the present (Nth day (dN))(S602). In this case, as shown in FIG. 8, the operating time is Ta for the usage mode corresponding to the class number 1, Tb for the usage mode corresponding to the class number 2, and Tc for the usage mode corresponding to the class number 3. The operating time calculation section 11 outputs to the life span estimation section 12 the operating times Ta, Tb and Tc calculated with regard to each of the usage modes.

The life span estimation section 12 calculates a consumed life span ratio CE of the engine and a consumed life span ratio CP of the hydraulic pump, using the operating times (Ta, Tb, Tc) calculated in S602 for each usage mode as well as the usage mode-specific estimated life spans (LEa, LEb, LEc, LPa, LPb, LPc) set for each component type and each usage type (class number) as shown in the table of FIG. 7. In this case, the calculations are performed using the expressions (1) and (2) given below. That is, the operating times (Ta, Tb, Tc) of each target component are first each divided by the corresponding usage mode-specific estimated life span (LEa, LEb, LEc; or LPa, LPb, LPc) to calculate the consumed life span ratio for each usage mode (S603). The consumed life span ratios thus calculated are added up to compute the consumed life span ratio of each target component. This makes it possible to calculate the consumed life span ratio CE of the engine and the consumed life span ratio CP of the hydraulic pump (S604).

$$CE = Ta/LEa + Tb/LEb + Tc/LEc. \quad (1)$$

$$CP = Ta/LPa + Tb/LPb + Tc/LPc. \quad (2)$$

The life span estimation section 12 calculates the remaining life span ratio of each target component using the consumed life span ratios CE and CP computed in S604. One way of calculating the remaining life span ratios is by subtracting the consumed life span ratios CE and CP from 1. In this case, the life span estimation section 12 calculates the remaining life span of each target component by further multiplying the remaining life span ratio by the average life span of the target component in question (S605). The average life span of each target component may be calculated by averaging the component operating times of replaced components of the same component type, for example. The life span estimation section 12 then outputs the remaining life spans calculated in S605 to the display device 3 so that the remaining life spans of the engine and hydraulic pump are displayed on the display device 3 (S606). Explained next using relevant drawings are display examples of the life spans of target components.

Figure 10:
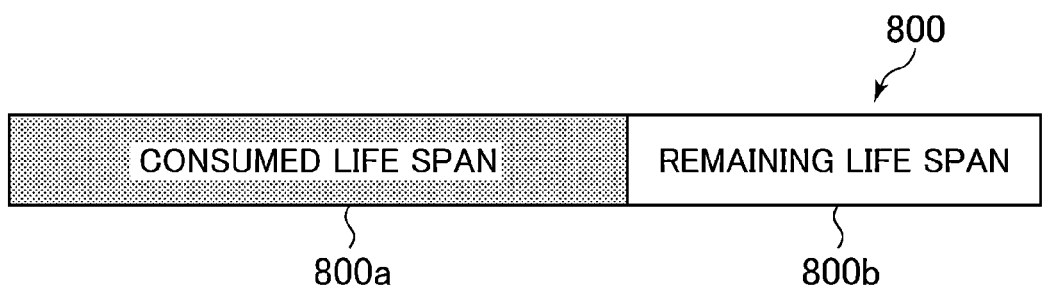
FIG. 10 is a typical display of the life span of a target component on a display device 3.

FIG. 10 is a typical display of the life span of a target component on the display device 3. A bar graph 800 shown in FIG. 10 is made up of a consumed life span display portion 800a hatched and indicative of the consumed life span of the target component, and a remaining life span display portion 800b not hatched and indicative of the remaining life span of the target component, the lengths of the bar portions representing the life span of the target component. When displayed visually in this manner, the life span of the target component is easy for an operator and administrator of the operating machine to understand. Incidentally, the screen of the display device 3 may display the time to replace the target component, the replacement time being estimated from the life span.

For the operating machine of this embodiment, as explained above, the operating time of a given target component in each usage mode is calculated from the operation history and discrimination threshold values of the target component in question. The remaining life span of the target component is calculated using the operating time in each usage mode and the usage mode-specific estimated life spans. Calculating the remaining life span in this manner can take into account past records of the usage modes of the target component to calculate the remaining life span. Thus even if the target component is used in a different usage mode on each different operating machine, the life span can be predicted for the respective usage modes. Improving the estimation accuracy in predicting the life span of the target component as described above helps contribute to efficient maintenance of the operating machine. For example, the user of the operating machine can cut down on costs associated with component replacement, while the manufacturer of the operating machine finds it easier to perform inventory control on its components.

Incidentally, displaying both consumed life span and remaining life span as shown in FIG. 10 makes it easier for the operator, administrator, etc., to comprehend the ratio of the consumed life span and the ratio of the remaining life span relative to the total life span. If it is desired to display the consumed life span side by side with the remaining life span as shown in FIG. 10, the process of calculating the consumed life span need only be carried out by multiplying the consumed life span ratio computed in S604 by the average life span used in S605, followed by the process of displaying the calculated consumed life span along with the remaining life span.

Figure 11:
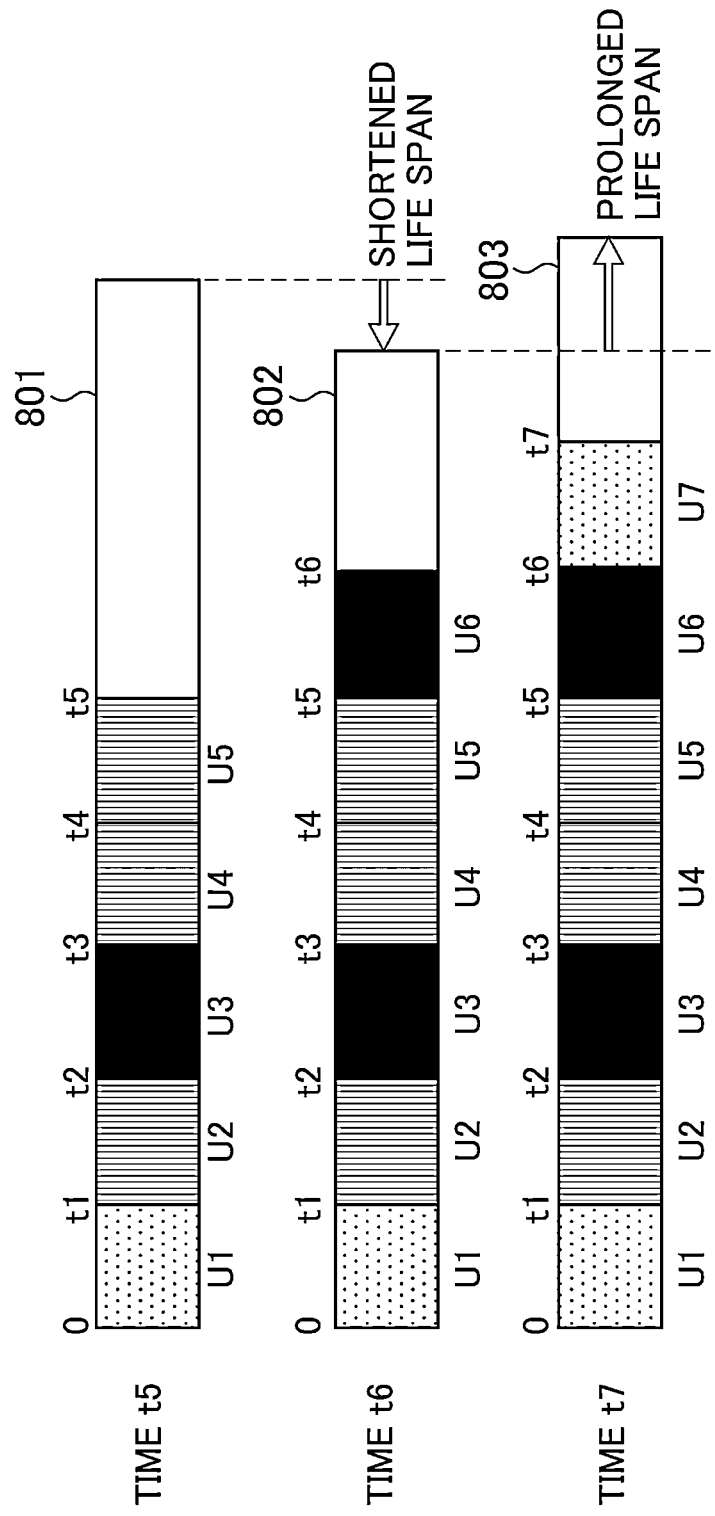
FIG. 11 is another typical display of the life span of a target component on the display device 3.

FIG. 11 is another typical display of the life span of a target component on the display device 3. A plurality of bar graphs 801, 802 and 803 in FIG. 11 denote the consumed life spans and remaining life spans at times t5, t6 and t7 in the case of predicting the life span of the same component at predetermined times t1, t2, t3, t4, t5, t6 and t7 after the start of operation of the hydraulic shovel 1. Specifically, the bar graph 801 in the upper part of FIG. 11 shows the life span at time t5; the bar graph 802 in the middle of FIG. 11 shows the life span at time t6; and the bar graph 803 in the lower part of FIG. 11 shows the life span at time t7. The lengths of the bar portions represent the lengths of time. As in FIG. 10, each hatched portion is the consumed life span portion displaying the consumed life span, and each portion not hatched is the remaining life span portion displaying the remaining life span.

In the display example of FIG. 11, the life spans of the target component are supplemented with the display of the operating times of the target component calculated for different usage modes (e.g., operating times Ta, Tb and Tc calculated earlier in S602) by the arithmetic and control unit 10 (operating time calculation section 11). Specifically, the operating times of the target component in different usage modes in FIG. 11 are displayed in relation to consumed life spans. That is, the density of the hatching in a given consumed life span portion indicates the class of the usage mode corresponding to the operating time of interest, and the bar length of each hatched portion in the consumed life span portion denotes the length of the operating time of interest. Also, the denser the hatching, the higher the load of the usage mode on the component is shown to be. In the example of FIG. 11, there are three different usage modes involving different loads. That is, the usage mode corresponding to a consumed life span portion U3 exerts the highest load on the component; the usage mode corresponding to a consumed life span portion U1 exerts the lowest load; and the usage mode corresponding to a consumed life span portion U2 exerts an intermediate load between the highest and the lowest loads. Incidentally, for purpose of simplifying the illustration, it is assumed here that the usage mode of the target component remained unchanged from time t1 to time t7 at each of which life span prediction was carried out.

If attention is focused here on a consumed life span portion U6 on the bar graph 802 at time t6, the usage mode with the highest load is shown to be in effect between time t5 and time t6. As a result of recalculation, the bar graph 802 is shown to be shorter than the bar graph 801. That is, the component life span has been shortened due to the usage mode between time t5 and time t6. Further, if attention is focused on a consumed life span portion U7 on the bar graph 802 at time t7, the usage mode with the lowest load is shown to be in effect between time t6 and time t7. The bar graph 803 is shown to be longer than the bar graphs 801 and 802. That is, the component life span has been prolonged due to the usage mode between time t6 and time t7.

Thus in the display example of FIG. 11, the bar portion indicative of the component life span is shown to vary in length depending on the load on the component (i.e., on the degree of wear of the component). Furthermore, the operating time of the target component in each usage mode is shown in association with the consumed life span. Displaying the component life span in this manner helps understand the correlation between usage mode and life span. The operator may thus be prompted to use the operating machine in a manner that will reduce component loads.

Whereas the life spans estimated at different times are displayed simultaneously in the example of FIG. 11, these life spans may be displayed individually. In addition, where the life spans of one of a plurality of components are to be displayed on the display device 3, the component with the shortest remaining life span should preferably have its life spans displayed.

In the foregoing example, the usage mode of the target component is assumed to have remained unchanged from time t1 to time t7 at each of which life span prediction was carried out. However, if there occurred different usage modes of the target component between time t1 and time t7, only the usage mode that contributed most to life span consumption between time t1 and time t7 may be displayed. In order to identify the usage mode that most contributed to life span consumption, a process need only be performed whereby the operating times in different usage modes are each divided by the corresponding usage mode-specific estimated life span before being compared for the difference in magnitude therebetween. (That is, a process need only be performed whereby the members on the right side of the expression (1) or (2) above are compared with one another for the difference in magnitude therebetween, and the usage mode corresponding to the largest member is displayed along with the consumed life span.)

Figure 12:
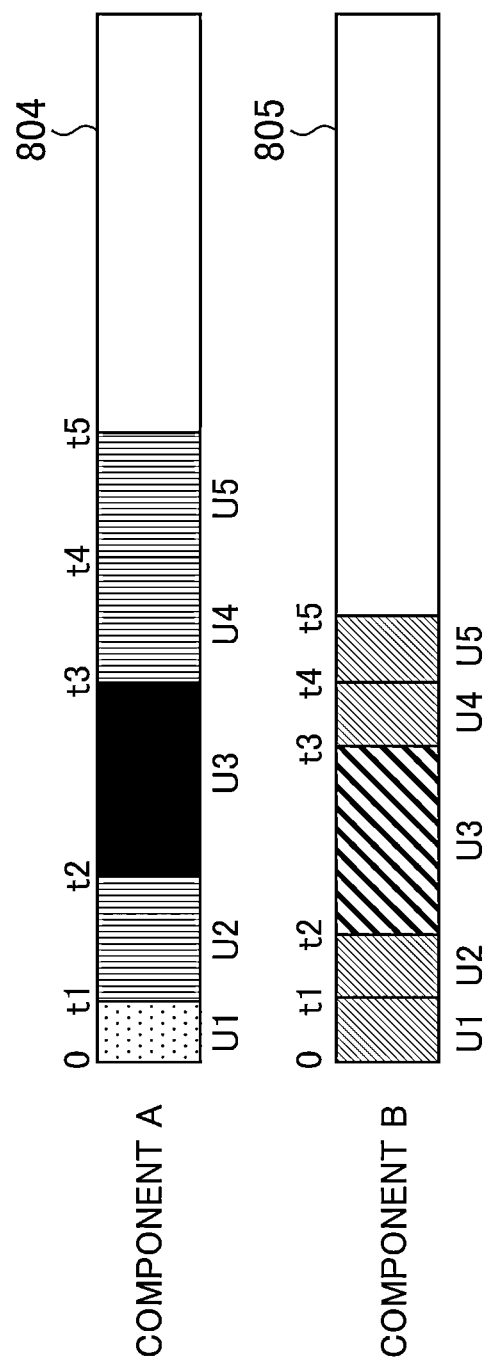
FIG. 12 is yet another typical display of the life spans of target components on the display device 3.

FIG. 12 is yet another typical display of the life spans of target components on the display device 3. A plurality of bar graphs 804 and 805 shown in FIG. 12 display the consumed life spans and remaining life spans at time t5 in the case of predicting the life spans of different components at predetermined times t1 to t5 after the start of operation of the hydraulic shovel 1. In FIG. 12, the upper bar graph 804 shows the life span of a component A and the lower bar graph 805 indicates the life span of a component B.

The consumed life spans and remaining life spans of the components A and B indicated by the bar graphs 804 and 805 are each displayed as the ratio relative to the total life span (sum of the consumed life span and remaining life span) of 1, which differs from the two preceding examples. That is, the lengths of the bar portions U1 through U5 each denote the ratio of the operating time in each different usage mode with respect to the consumed life span. Also, the bar graphs 804 and 805 indicate the life spans of the different components A and B. Thus even if the operating time is the same for the components A and B, the loads on the components A and B are different. That means the ratio of the life span consumed by each of the components is not the same. For example, the component B represented by the bar graph 805 is shown to consume its life span in the same usage mode over U1 and U2, while the component A indicated by the bar graph 804 is shown to consume its life span in different usage modes over U1 and U2. Also in the display example of FIG. 12, the magnitude of the load on each component translates into the bar length of the consumed life span portion. That is, the higher the load on the component, the longer the consumed life span portion is displayed to be, and the lower the load, the shorter the consumed life span portion is displayed to be.

When the life spans of a plurality of components are displayed simultaneously on the same screen as described above, it is easy to compare the life spans of the different components. Therefore, where there exist multiple components nearing the end of their life spans (time for replacement), for example, it is easy to recognize the presence of these components and to replace the multiple components at the same time, whereby the efficiency of maintenance work is improved. Incidentally, although the life spans of two components are shown in the example of FIG. 12, it is obvious that the life spans of three or more components may be displayed simultaneously.

A second embodiment of the present invention is explained next. This embodiment is characterized in that the usage mode-specific estimated life spans stored in the usage mode-specific estimated life span storage section 25 in the first embodiment are calculated from past replacement records of the components on a plurality of hydraulic shovels and that the life spans of target components are estimated using the usage mode-specific estimated life spans thus calculated.

Figure 13:
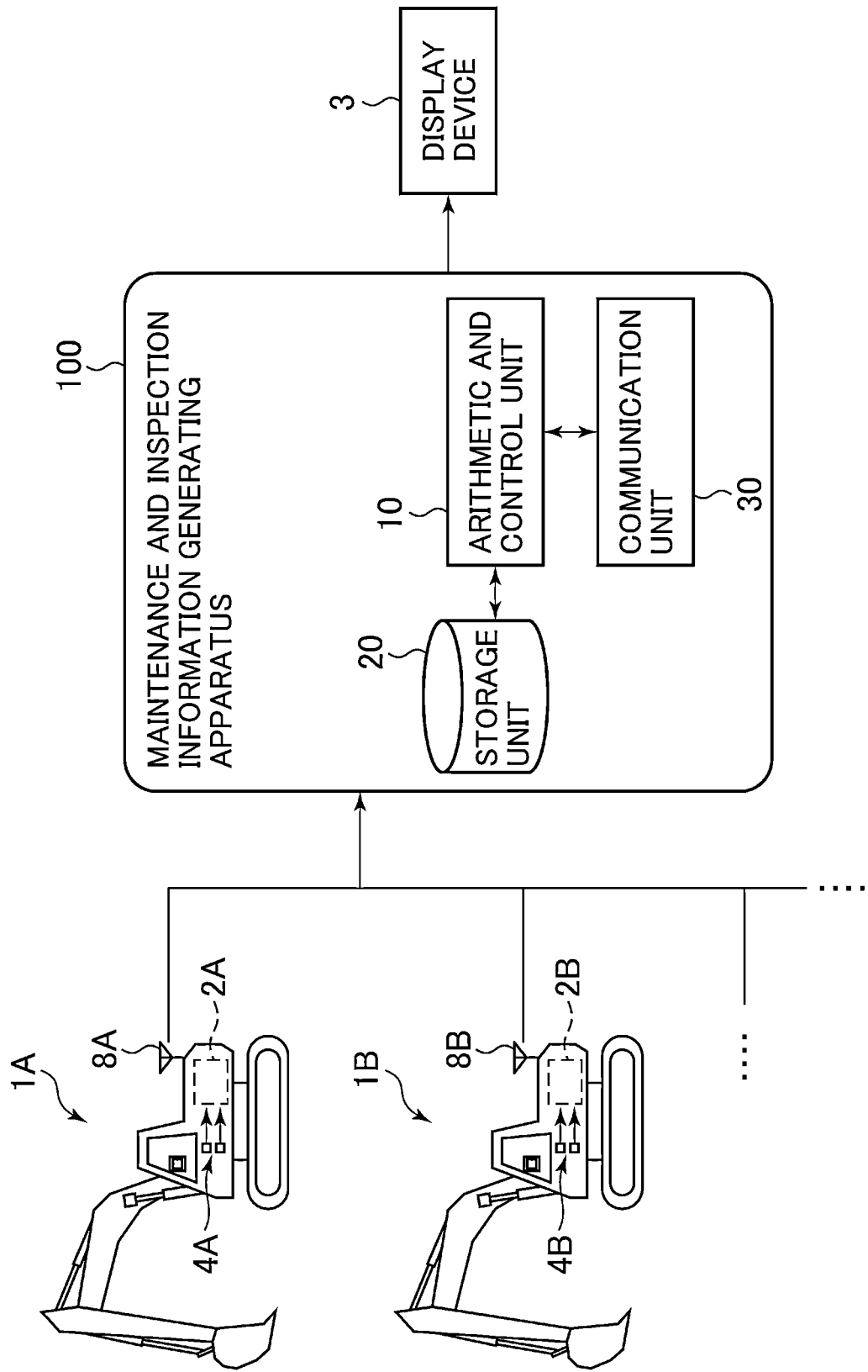
FIG. 13 is a configuration diagram of a maintenance and inspection system according to a second embodiment of the present invention.

FIG. 13 is a configuration diagram of a maintenance and inspection system according to the second embodiment of the present invention. The maintenance and inspection system in FIG. 13 includes a plurality of hydraulic shovels (operating machines) 1A, 1B, etc., a maintenance and inspection information generating apparatus 100, and a display device 3. It is to be noted that the same parts as those in the preceding drawings are denoted by the same reference numerals, and their descriptions are omitted as appropriate.

The multiple hydraulic shovels shown in FIG. 13 are each furnished with a communication device 8 in addition to the same configuration (of the control device 2, sensor group 4, display device 3, etc.) as that of the hydraulic shovel 1 indicated in FIG. 1. Where the individual hydraulic shovels are to be distinguished from each other, their reference numerals are each suffixed with an alphabetical character (A, B, etc.). Where there is no need to distinguish these hydraulic shovels, their reference numerals are not suffixed with any alphabetical character. The control device 2 on each hydraulic shovel 1 outputs the operation histories input from the sensor group 4 to the maintenance and inspection information generating apparatus 100 via the communication device 8.

The maintenance and inspection information generating apparatus 100 generates maintenance and inspection information about each component (e.g., life span of each component) based on the operation histories of components input from a plurality of hydraulic shovels 1. As such, the maintenance and inspection information generating apparatus 100 includes an arithmetic and control unit 10, a storage unit 20, and a communication unit 30. The maintenance and inspection information generated by the maintenance and inspection information generating apparatus 100 is output to and displayed on the display device 3.

Figure 14:
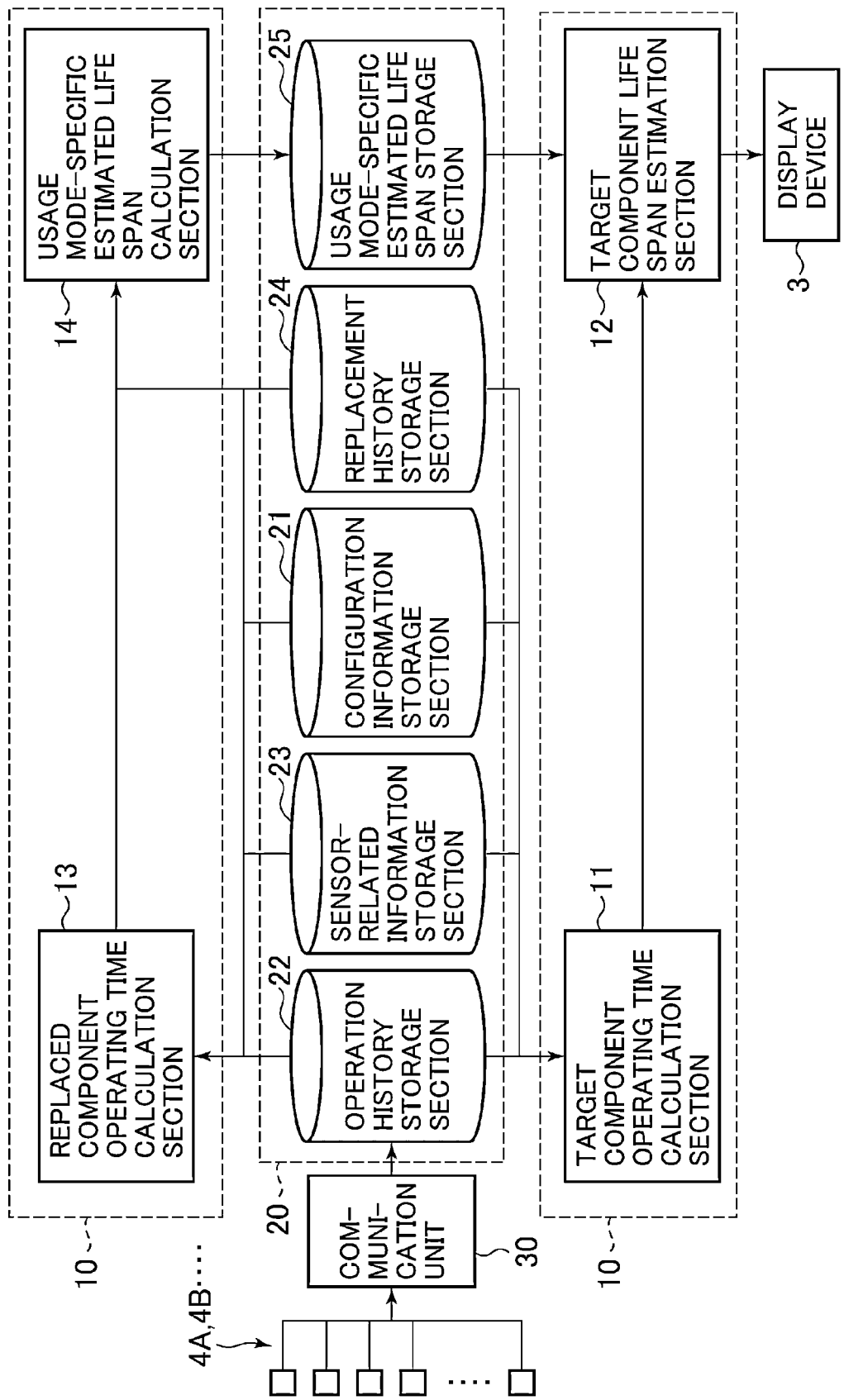
FIG. 14 is a detail plan showing the hardware configuration of a maintenance and inspection information generating apparatus 100 and its peripheries.

FIG. 14 is a detail plan showing the hardware configuration of the maintenance and inspection information generating apparatus 100 and its peripheries. As with its counterpart shown in FIG. 3, the storage unit 20 of the maintenance and inspection information generating apparatus 100 includes a configuration information storage section 21, an operation history storage section 22, a sensor-related information storage section 23, a replacement history storage section 24, and a usage mode-specific estimated life span storage section 25 as indicated in FIG. 14. The operation history storage section 22 stores operation histories of the components (currently operating and previously operated components) of a plurality of hydraulic shovels 1A, 1B, etc. The operation histories detected by the sensor group 4 on each hydraulic shovel 1 are each input to the maintenance and inspection information generating apparatus 100 via the communication unit 30 before being stored into the operation history storage section 22.

FIG. 15 is a table showing typical data stored in the replacement history storage section 24 according to the second embodiment of the present invention. As shown in FIG. 15, the replacement history storage section 24 stores the dates and times of the replacement of the replaced components previously operated on each hydraulic shovel 1, the machine number of the machine on which the replaced components were operated, the component numbers of the replaced components, the component types of the replaced components, and the component operating times of the replaced components.

Returning to FIG. 14, the arithmetic and control unit 10 of the maintenance and inspection information generating apparatus 100 functions as a replaced component operating time calculation section (second operating time calculation section) 13 and a usage mode-specific estimated life span calculation section 14, in addition to acting as the target component operating time calculation section (first operating time calculation section) 11 and target component life span calculation section 12 explained above.

The replaced component operating time calculation section (second operating time calculation section) 13 is a section that performs the process of calculating the operating time of a given target replaced component in each of different usage modes, based on the operation histories of replaced components of the same type (called "the target replaced component" hereunder where appropriate) as that of the target component (component targeted for life span estimation) from among the operation histories stored in the operation history storage section 22 and on the basis of the same discrimination threshold values as those of the target component from among the discrimination threshold values stored in the sensor-related information storage section 23. The operating time of the target replaced component calculated here for each of different usage modes is output to the usage mode-specific estimated life span calculation section 14. Incidentally, upon identification of the replaced components of the same type as that of the target component, the replaced component operating time calculation section 12 may employ as needed the information stored in the configuration information storage section 21; upon identification of the operation history of the target replaced component, the replaced component operating time calculation section 12 may utilize as needed the information stored in the replacement history storage section 24.

FIG. 16 is a table showing typical operating time data about target replaced components calculated for each of different usage modes by the replaced component operating time calculation section 13 according to the second embodiment of the present invention. In the example shown in FIG. 16, the target components are the engine and hydraulic pump as with the first embodiment. The operation histories of the replaced engine and hydraulic pump are classified using the same discrimination threshold values R1, R2 and P1 as those for the first embodiment so as to calculate the operating times of the target replaced components in three usage modes (with class numbers 1, 2 and 3). Adding up the operating times of each target replaced component in each of the usage modes equals the component operating time of the component in question. That is, the operating times of the engine having the component number e1 in each of the usage modes in FIG. 16 are Tae1, Tbe2 and Tce1, for example. Adding up these operating times equals the component operating time LE1 (see FIG. 15) of the engine in question. Also as indicated in FIG. 16, a total of "n" components are stored under the component type "engine" and a total of "m" components are stored under the component type "pump."

The usage mode-specific estimated life span calculation section 14 is a section that performs the process of calculating the usage mode-specific estimated life span of a given target replaced component by averaging, for each of different usage modes, the operating times of the component in question calculated for each of different usage modes by the replaced component operating time calculation section 13. The usage mode-specific estimated life spans calculated here are stored into the usage mode-specific estimated life span storage section 25. Incidentally, upon calculation of the usage mode-specific estimated life span, the usage mode-specific estimated life span calculation section 14 may employ as needed the information stored in the replacement history storage section 24 or the like (e.g., component operating times of target replaced components).

Explained next using the drawing is a typical usage mode-specific estimated life span calculation process to be performed by the maintenance and inspection information generating apparatus 100 of the present embodiment. As with the first embodiment, what is explained here is the case where the engine and hydraulic pump are selected as the target components for life span estimation.

FIG. 17 is a flowchart of a typical usage mode-specific estimated life span calculation process performed by the maintenance and inspection information generating apparatus 100 according to the second embodiment of the present invention. As shown in FIG. 17, the replaced component operating time calculation section 13 first reads from the operation history storage section 22 a plurality of operation histories of replaced components of the same type as that of the target components (engine and hydraulic pump) and, using the discrimination threshold values R1, R2 and P1, classifies each of the operation histories into three usage modes (S710). Then based on the operation histories classified in S710, the replaced component operating time calculation section 13 adds up the operating times of each target replaced component in each of the usage modes to calculate the operating time of each target replaced component in each usage mode (S720). FIG. 16 lists typical operating times thus calculated.

Next, the usage mode-specific estimated life span calculation section 14 calculates the average operating time of each target replaced component in each of the usage modes based on the operating time of each target replaced component calculated in S720 for each usage mode and on the component operating time of each target replaced component stored in the replacement history storage section 24 (S730). With this embodiment, S730 specifically involves execution of a process ranging from S731 to S734, to be described below.

Figure 18:
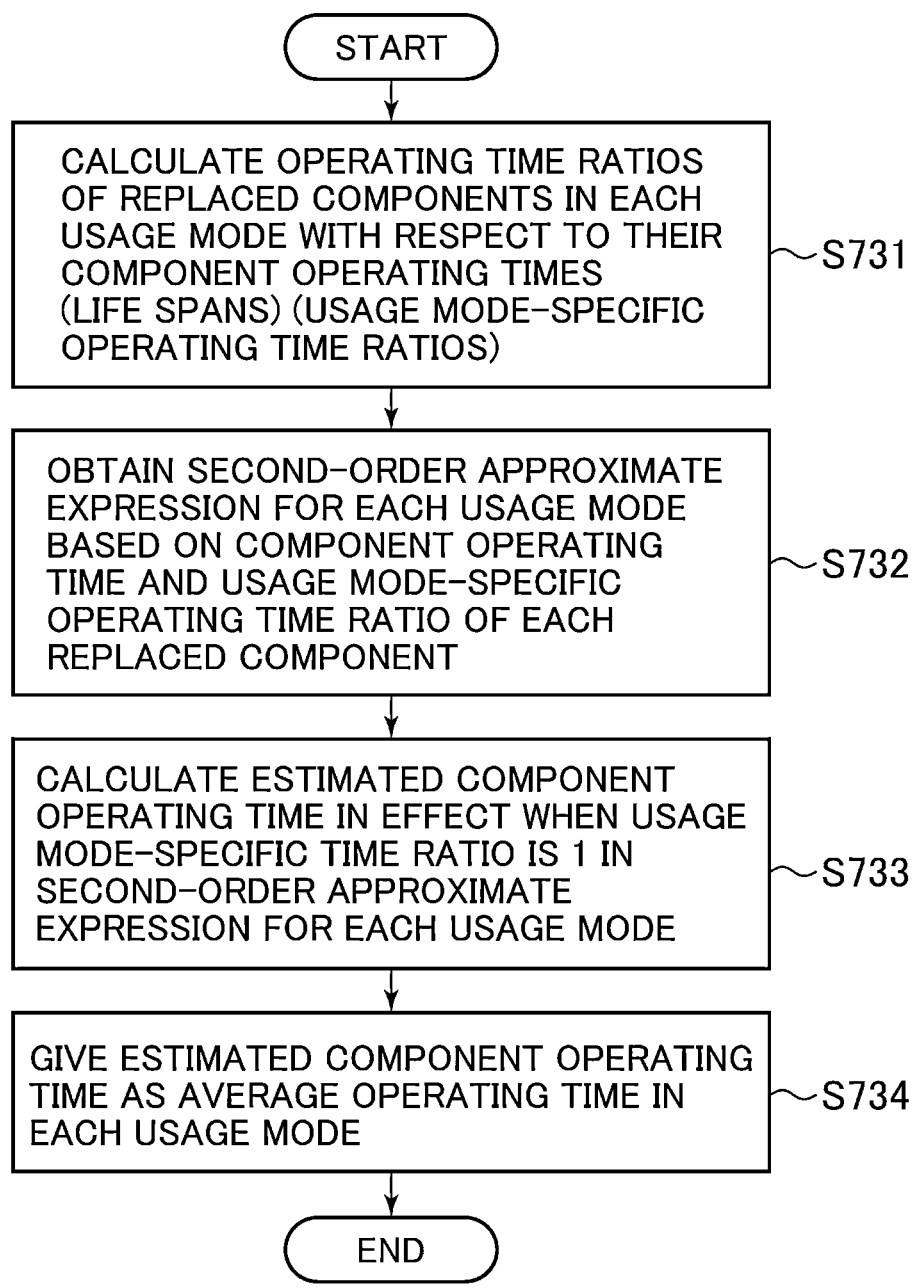
FIG. 18 is a flowchart of a typical process for calculating the average operating time for each of different usage modes, the process being performed by a usage mode-specific estimated life span calculation section 14 according to the second embodiment of the present invention.

FIG. 18 is a flowchart of a typical process for calculating the average operating time for each of different usage modes, the process being performed by the usage mode-specific estimated life span calculation section 14 according to the second embodiment of the present invention.

As shown in FIG. 18, the usage mode-specific estimated life span calculation section 14 first calculates the ratio of the operating time of each target replaced component in each usage mode with respect to the corresponding component operating time (the ratio may be called "usage mode-specific operating time ratio" where appropriate). Specifically, using the expressions (3) and (4) below and based on the component operating time (LEi) and on the operating times in each of the usage modes (Taei, Tbei, Tcei, Tapj, Tbpj, Tcpj), the usage mode-specific estimated life span calculation section 14 calculates the usage mode-specific operating time ratios (Raei, Rbei, Rcei, Rapj, Rbpj, Rcpj)(S731). That is, the usage mode-specific operating time ratios are each obtained by dividing the operating time in each usage mode by the component operating time. It should be noted here that the operating times in each of the usage modes are values calculated in S720 and that the component operating time is a value retrieved from the replacement history storage section 24. Also, the expressions (3) and (4) provide the usage mode-specific operating time ratios for the component types "engine" and "pump," respectively.

$$Raei=Taei/LEi\ (i=1,\ldots,n)$$

$$Rbei=Tbei/LEi$$

$$Rcei=Tcei/LEi \quad (3)$$

$$Rapj=Tapj/IPj\ (j=1,\ldots,m)$$

$$Rbpj=Tbpj/LPj$$

$$Rcpj=Tcpj/LPj$$

Next, the usage mode-specific estimated life span calculation section 14 forms, for each usage mode, sample sets each combining the component operating time with each of the usage mode-specific operating time ratios calculated in S731, and obtains for each usage mode a second-order polynomial approximate expression based on the usage mode-specific sample sets thus formed (S732).

The approximate expression obtained in S732 is an expression indicative of the relation between the usage mode-specific operating time ratio and the component operating time. Calculated next is the component operating time in effect when the usage mode-specific operating time ratio is 1 in the approximate expression above, so as to obtain the component operating time as an estimated component operating time for each usage mode (S733). The estimated component operating time calculated for each usage mode in S733 is output as the average operating time in each usage mode (S734).

After the average operating time in each usage mode (usage mode-specific estimated component operating time) is calculated in S730, the results are output as the usage mode-specific estimated life spans of the target components to the usage mode-specific estimated life span storage section 25 for storage (S740). In this manner, the usage mode-specific estimated life spans of the target components (engine and hydraulic pump) are obtained. Thus when the target component operating time calculation section 11 and Target component life span estimation section 12 perform the same processes as those explained in the first embodiment, the life spans of the target components can be calculated thereby. Furthermore, if the life spans of the target components are displayed on the display device 3 on the basis of the target component life spans calculated by the maintenance and inspection information generating apparatus 100, the same effects as those explained in the first embodiment can be obtained.

Thus according to the present embodiment configured as described above, it is possible to correct the usage mode-specific estimated life span of each component by use of past records of the life spans of the components actually used on a plurality of operating machines. This makes it possible to further improve the accuracy in estimating the life span of each component.

Incidentally, whereas the second embodiment above was shown to display the life spans of the target components via the display device 3 connected to the maintenance and inspection information generating apparatus 100, the life spans of the target components calculated by the maintenance and inspection information generating apparatus 100 may be arranged alternatively to be transmitted to another display device (e.g., display device that is mounted on the hydraulic shovel 1) via communication means such as wireless communication means so that the life spans of the target components of interest may be displayed on that other display device.

Furthermore, whereas the second embodiment has the maintenance and inspection information generating apparatus 100 carry out a series of processes up to calculation of the life spans of the target components, the maintenance and inspection information generating apparatus 100 may be arranged alternatively to calculate only the average operating times in each usage mode (i.e., usage mode-specific estimated life spans). The usage mode-specific estimated life spans thus calculated may then be transmitted to the hydraulic shovel 1 (operating machine) via communication means such as wireless communication means so that the subsequent processes up to life span calculation may be carried out on the hydraulic shovel 1 in question. In this case, that is, the usage mode-specific estimated life spans transmitted from the maintenance and inspection information generating apparatus 100 are stored into that usage mode-specific estimated life span storage section 25 of the hydraulic shovel 1 explained above in conjunction with the first embodiment, so that the hydraulic shovel 1 in question will calculate the life spans of the target components based on the usage mode-specific estimated life spans of interest.

Meanwhile, whereas the embodiments explained above were shown adopting a hydraulic shovel as the typical operating machine, the present invention can be applied extensively to other operating machines made up of diverse components.

DESCRIPTION OF REFERENCE CHARACTERS

1 Hydraulic shovel
2 Control device
3 Display device
4 Sensor group
8 Communication device
10 Arithmetic and control unit
11 Target component operating time calculation section (first operating time calculation section)
12 Target component life span estimation section
13 Replaced component operating time calculation section (second operating time calculation section)
14 Usage mode-specific estimated life span calculation section
20 Storage unit
21 Configuration information storage section
22 Operation history storage section
23 Sensor-related information storage section
24 Replacement history storage section
25 Usage mode-specific estimated life span storage section
30 Communication unit
41 Engine revolution speed sensor
42 Pressure sensor
100 Maintenance and inspection information generating apparatus

The invention claimed is:

1. An operating machine constituted by a plurality of components, said operating machine comprising:
a storage unit which stores an operation history of a target component included in said plurality of components and targeted for life span estimation, a discrimination threshold value used for classifying usage of said target component into a plurality of usage modes based on said operation history, and a usage mode-specific estimated life span indicative of an estimated life span of said target component in each of said usage modes; and
an arithmetic and control unit which performs a process of calculating an operating time of said target component in each of said usage modes by classifying said operation history of said target component in accordance with said discrimination threshold value, and a process of estimating the life span of said target component based on the operating time of said target component calculated for each of said usage modes in the aforementioned process and on said usage mode-specific estimated life span;
wherein said usage mode-specific estimated life span is calculated on the basis of the operating times of a plurality of replaced components of the same type as the type of said target component in each of said usage modes.

2. An operating machine constituted by a plurality of components, said operating machine comprising:
a sensor which detects an operation history of a target component included in said plurality of components and targeted for life span estimation;
a storage unit which stores a discrimination threshold value used for classifying usage of said target component into a plurality of usage modes based on the magnitude of values detected by said sensor, and a usage mode-specific estimated life span indicative of the life span of said target component estimated for each of said usage modes; and
an arithmetic and control unit which performs a process of calculating an operating time of said target component in each of said usage modes by classifying the detected values from said sensor in accordance with said discrimination threshold value, and a process of estimating the life span of said target component based on the operating time of said target component calculated for each of said usage modes in the aforementioned process and on said usage mode-specific estimated life span
wherein said usage mode-specific estimated life span is calculated on the basis of the operating times of a plurality of replaced components of the same type as the type of said target component in each of said usage modes.

3. The operating machine according to claim 1, wherein, in performing the process of estimating the life span of said target component, said arithmetic and control unit estimates the life span of said target component based on the ratio of the operating time of said target component in each of said usage modes with respect to said usage mode-specific estimated life span.

4. The operating machine according to claim 1, further comprising
a display device which displays the life span of said target component estimated by said arithmetic and control unit.

5. The operating machine according to claim 4, further comprising wherein said display device displays the operating time of said target component calculated for each of said usage modes by said arithmetic and control unit, along with the life span of said target component.

6. The operating machine according to claim 4, wherein, as the process of estimating said life span, said arithmetic and control unit performs a process of calculating a consumed life span and a remaining life span of said target component, and said display device displays the consumed life span and remaining life span calculated by said arithmetic and control unit.

7. A maintenance and inspection information generating apparatus for use with an operating machine constituted by a plurality of components, said maintenance and inspection information generating apparatus comprising:
a storage unit which stores an operation history of a target component included in said plurality of components and targeted for life span estimation, a discrimination threshold value used for classifying usage of said target component into a plurality of usage modes based on said operation history, and a usage mode-specific estimated life span indicative of an estimated life span of said target component in each of said usage modes, and operation histories of a plurality of replaced components of the same type as the type of said target component; and
an arithmetic and control unit which performs a process of calculating an operating time of said target component in each of said usage modes by classifying the operation history of said target component in accordance with said discrimination threshold value, a process of calculating said usage mode-specific estimated life span based on the operation histories of said replaced components in each of said usage modes in accordance with said discrimination threshold value, and a process of estimating the life span of said target component based on said usage mode-specific estimated life span calculated in the aforementioned process and on the operating time of said target component in each of said usage modes.

8. The operating machine according to claim 2, wherein, in performing the process of estimating the life span of said target component, said arithmetic and control unit estimates the life span of said target component based on the ratio of the operating time of said target component in each of said usage modes with respect to said usage mode-specific estimated life span.

9. The operating machine according to claim 2, further comprising a display device which displays the life span of said target component estimated by said arithmetic and control unit.

* * * * *